United States Patent
Fassbender

(10) Patent No.: US 11,763,681 B2
(45) Date of Patent: Sep. 19, 2023

(54) ECU AND LANE DEPARTURE WARNING SYSTEM

(71) Applicant: Robert Bosch GmbH, Stuttgart (DE)

(72) Inventor: Bjoern Fassbender, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/055,748

(22) PCT Filed: Apr. 5, 2019

(86) PCT No.: PCT/IB2019/052807
§ 371 (c)(1),
(2) Date: Nov. 16, 2020

(87) PCT Pub. No.: WO2019/220229
PCT Pub. Date: Nov. 21, 2019

(65) Prior Publication Data
US 2021/0206315 A1    Jul. 8, 2021

(30) Foreign Application Priority Data
May 15, 2018    (JP) .................................. 2018-094080

(51) Int. Cl.
*B60Q 1/50*    (2006.01)
*B60Q 5/00*    (2006.01)
*G08G 1/16*    (2006.01)

(52) U.S. Cl.
CPC ............. *B60Q 1/525* (2013.01); *B60Q 5/006* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 7,432,800 | B2* | 10/2008 | Harter, Jr. | ............... B60Q 9/008 340/436 |
| 10,460,600 | B2* | 10/2019 | Julian | ..................... G08G 1/015 |
| 10,782,654 | B2* | 9/2020 | Campos | ............... G08G 1/0141 |
| 10,885,777 | B2* | 1/2021 | Annapureddy | ........... G08G 1/04 |
| 11,315,429 | B1* | 4/2022 | Balmaceda | .......... G08G 1/0967 |

(Continued)

FOREIGN PATENT DOCUMENTS

| | | |
|---|---|---|
| JP | 2006044498 A | 2/2006 |
| JP | 2012523057 A | 9/2012 |

(Continued)

OTHER PUBLICATIONS

International Search Report and Written Opinion for Application No. PCT/IB2019/052807 dated Aug. 1, 2019 (9 pages).

*Primary Examiner* — Muhammad Adnan
(74) *Attorney, Agent, or Firm* — Michael Best & Friedrich LLP

(57) ABSTRACT

The present invention proposes an ECU and a lane departure warning system capable of improving safety of all traveling vehicles including a host vehicle by using an environment sensor to warn another vehicle about departure of the other vehicle from a lane.
An ECU (13) detects the departure from the lane. The ECU (13) determines whether another vehicle (100) leaves the lane on the basis of a detection signal from an environment sensor (11), and visually or aurally warns the other vehicle (100) in the case where the other vehicle (100) leaves the lane.

7 Claims, 3 Drawing Sheets

(56) References Cited

U.S. PATENT DOCUMENTS

| | | | |
|---|---|---|---|
| 11,322,018 B2* | 5/2022 | Julian | G06V 20/38 |
| 11,325,523 B2* | 5/2022 | Dingli | B60Q 1/18 |
| 2008/0097700 A1* | 4/2008 | Grimm | G08G 1/165 |
| | | | 701/301 |
| 2008/0243337 A1* | 10/2008 | Tsuda | B60W 50/14 |
| | | | 701/41 |
| 2013/0282271 A1* | 10/2013 | Rubin | H04W 4/027 |
| | | | 701/410 |
| 2015/0183430 A1 | 7/2015 | Schwindt et al. | |
| 2015/0314790 A1* | 11/2015 | Deragarden | B60Q 9/008 |
| | | | 703/8 |
| 2016/0318511 A1* | 11/2016 | Rangwala | B60Q 1/525 |
| 2016/0343254 A1* | 11/2016 | Rovik | G08G 1/096716 |
| 2018/0096601 A1* | 4/2018 | Chow | H04W 84/00 |
| 2018/0206083 A1* | 7/2018 | Kumar | H04W 4/33 |
| 2020/0324765 A1* | 10/2020 | Lanfranco | B60W 30/143 |
| 2022/0314940 A1* | 10/2022 | Kim | G06V 20/58 |
| 2022/0348139 A1* | 11/2022 | Roeber | B60Q 1/535 |

FOREIGN PATENT DOCUMENTS

| | | | |
|---|---|---|---|
| JP | 2013077070 A | | 4/2013 |
| JP | 2013252796 A | * | 12/2013 |
| JP | 2013252796 A | | 12/2013 |
| JP | 2016536703 A | | 11/2016 |
| KR | 20140076414 A | * | 6/2014 |
| WO | WO-2020210338 A1 | * | 10/2020 |

* cited by examiner

[FIG. 1]
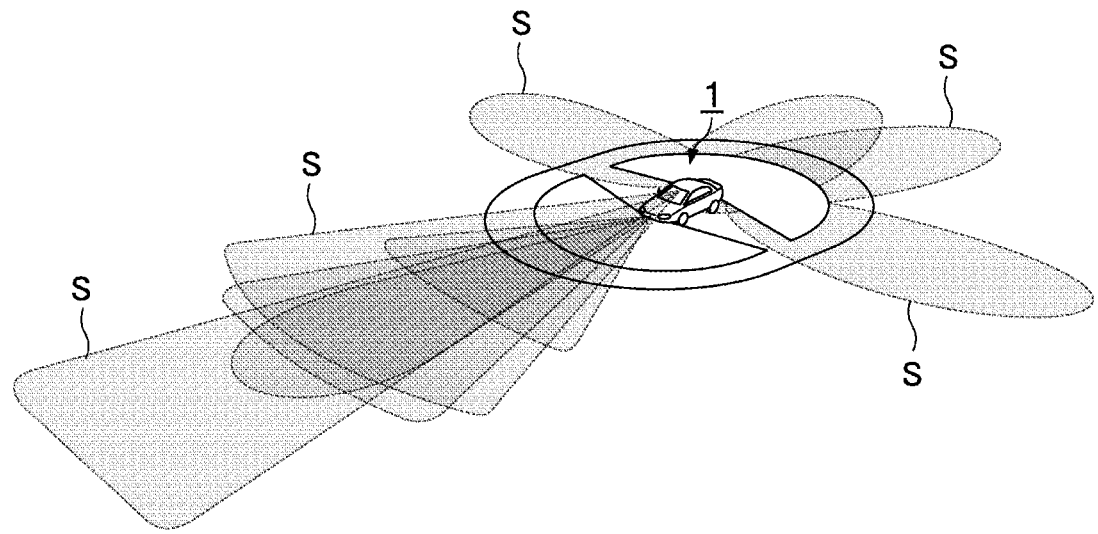
[FIG. 2]
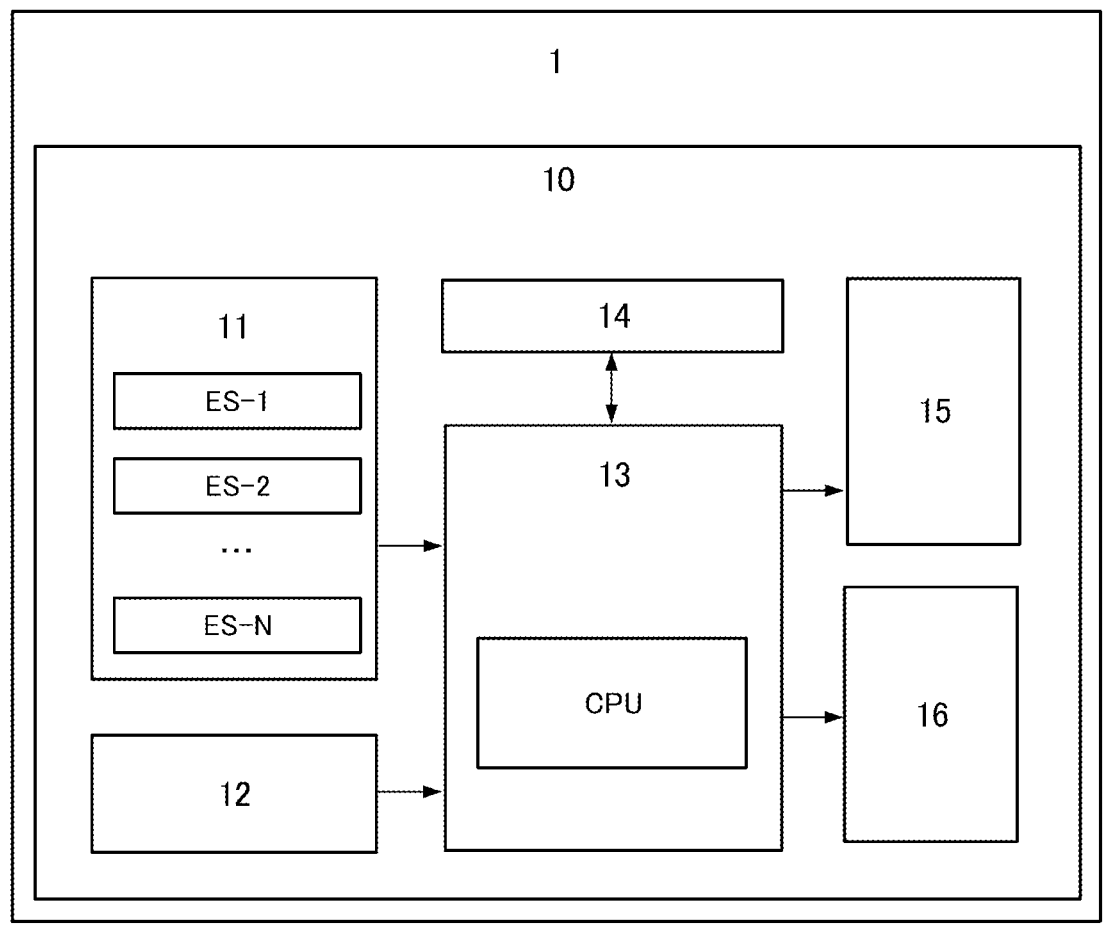

[FIG. 3]
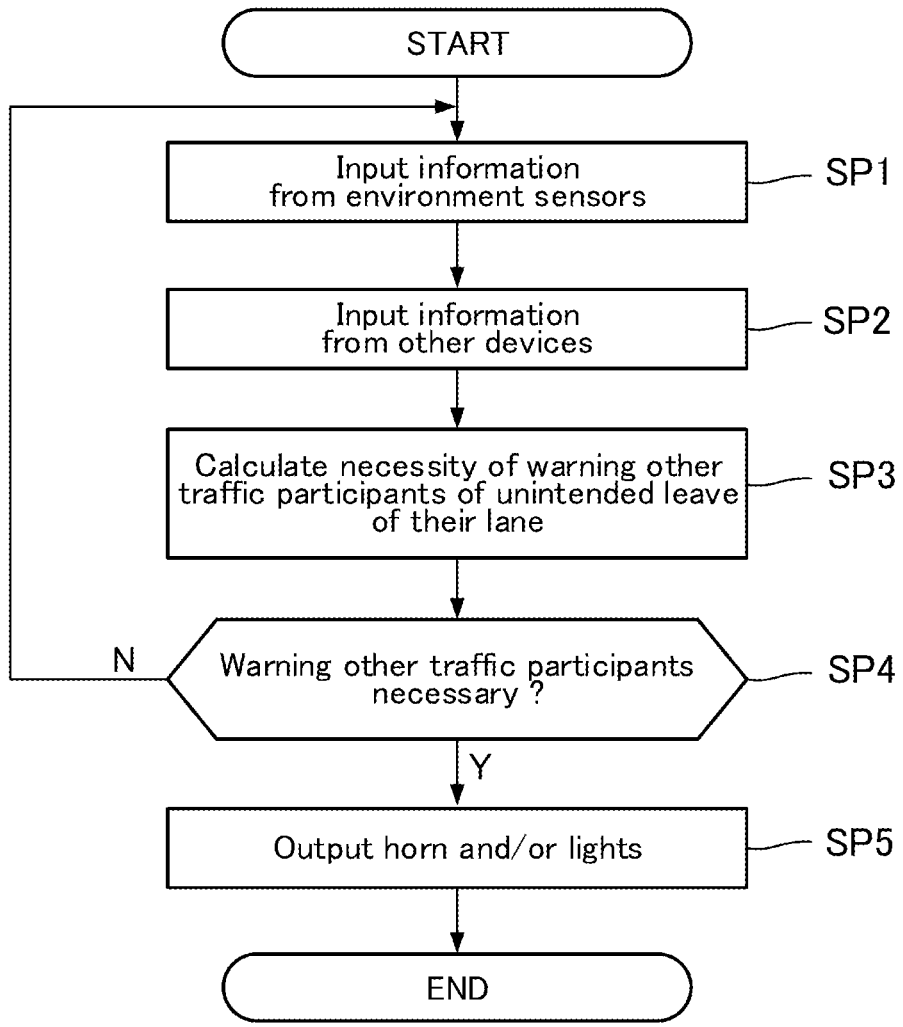
[FIG. 4]
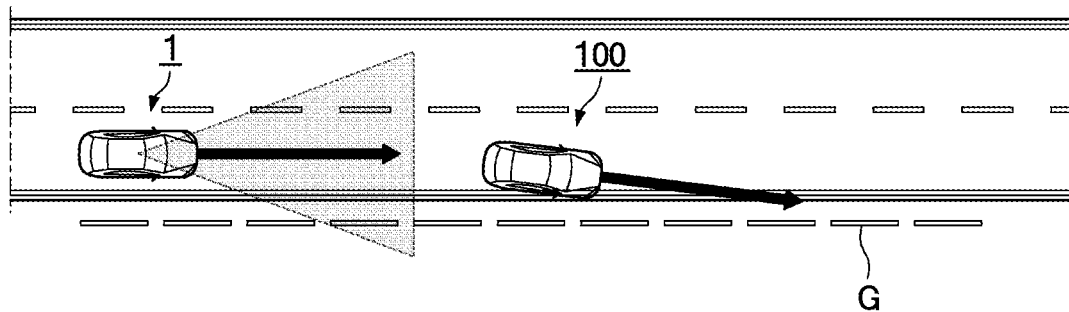

[FIG. 5]
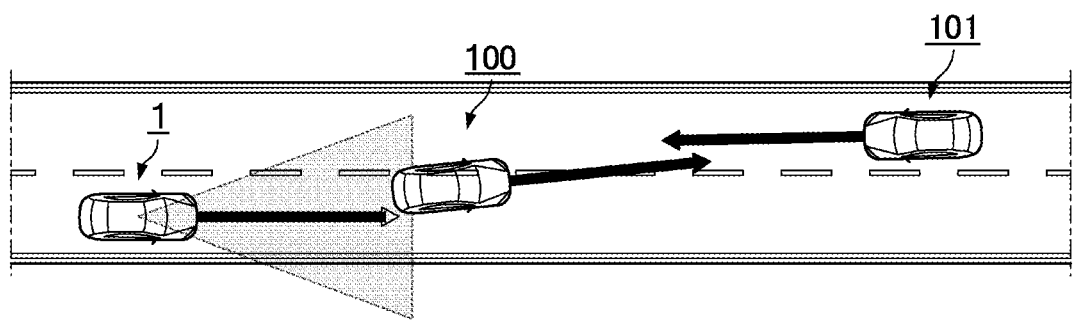
[FIG. 6]
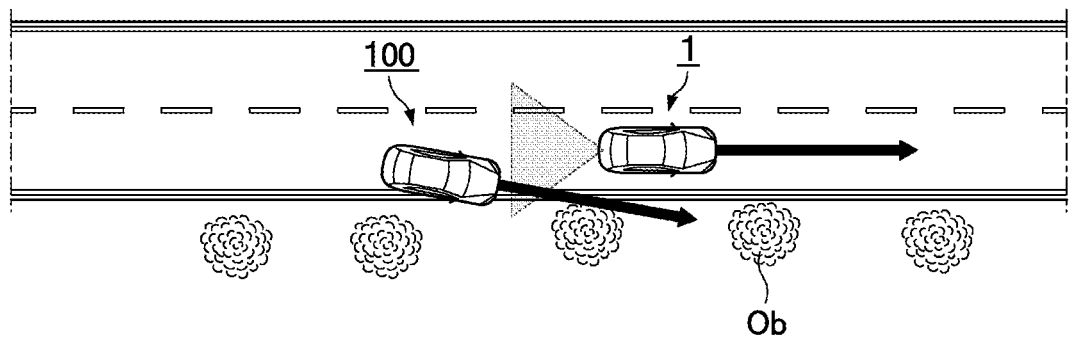

ECU AND LANE DEPARTURE WARNING SYSTEM

BACKGROUND OF THE INVENTION

The present invention relates to an ECU and a lane departure warning system.

In recent years, an environment sensor is mounted on many vehicles. More specifically, the environment sensors include a radar sensor, a video sensor, an ultrasonic sensor, a LiDAR (light detection and ranging) sensor, and the like. A main purpose of each of these environment sensors is to monitor a situation around the vehicle. By monitoring the situation around the vehicle, it is possible to detect unintentional lane departure by a driver, for example. As a result, safety of the vehicle can be improved.

In JP-T-2016-536703, a method and a system for detecting lane departure by using an environment sensor disposed at the rear of the vehicle are disclosed. More specifically, the environment sensor is used to detect existence and a speed of another vehicle that is located behind a host vehicle and to detect a distance between the host vehicle and a lane. In the case where the distance between the host vehicle and the lane is equal to or shorter than a threshold value and the other vehicle is detected, the driver is warned sooner as the speed of the other vehicle is higher, so as to improve the safety of the vehicle.

By the way, as disclosed in JP-T-2016-536703, a technique of warning the lane departure by using the environment sensor (lane departure warning (LDW)) has conventionally been known. However, this technique warns the driver of the host vehicle about the lane departure of the host vehicle and does not warn the other vehicle about the lane departure of the other vehicle.

Even when the host vehicle is warned about the lane departure of the host vehicle, it is impossible to prevent the lane departure of the other vehicle that travels near the host vehicle. There is a problem that the lane departure of the other vehicle undermines the safety of the host vehicle and all the traveling vehicles including the host vehicle.

SUMMARY OF THE INVENTION

The present invention has been made in consideration of the above points and proposes an ECU and a lane departure warning system capable of improving safety of all traveling vehicles including a host vehicle by using an environment sensor to warn another vehicle about departure of the other vehicle from a lane.

Solution to Problem

In order to solve such problems, in the present invention, an ECU (13) detects departure from a lane. The ECU (13) determines whether another vehicle (100) leaves the lane on the basis of a detection signal from an environment sensor (11), and visually or aurally warns the other vehicle (100) in the case where the other vehicle (100) leaves the lane.

Advantageous Effects of Invention

According to the present invention, safety of all traveling vehicles including a host vehicle can be improved by using the environment sensor to warn the other vehicle about the departure of the other vehicle from the lane.

BRIEF DESCRIPTION OF DRAWINGS

FIG. 1 is an overall configuration view of a vehicle.
FIG. 2 is a functional block diagram of a lane departure warning system.
FIG. 3 is a flowchart of lane departure warning processing.
FIG. 4 is a view of an exemplary circumstance where another vehicle is warned about lane departure.
FIG. 5 is a view of another exemplary circumstance where the other vehicle is warned about the lane departure.
FIG. 6 is a view of yet another exemplary circumstance where the other vehicle is warned about the lane departure.

DETAILED DESCRIPTION

A description will hereinafter be made on an embodiment of the present invention with reference to the drawings. Note that the following description will be made merely on the embodiment of the present invention, and the technical scope of the present invention is not limited thereto.

FIG. 1 illustrates an overall configuration of a vehicle 1 according to this embodiment. The vehicle 1 includes an environment sensor in addition to various types of equipment and devices obviously provided in a normal vehicle. In order to exert a function of the environment sensor around the vehicle 1, the plural environment sensors are provided on front, rear, right, and left sides of the vehicle 1. Each region S illustrated in FIG. 1 represents a region that can be detected by each of the plural environment sensors.

More specifically, each of the environment sensors is a radar sensor, a video sensor, an ultrasonic sensor, a LiDAR sensor, or the like. When detecting another vehicle that exists in the region S, the environment sensor transmits a detection signal to an electronic control unit (ECU). The detection signal includes information on a distance between the other vehicle and a lane.

FIG. 2 is a functional block diagram of a lane departure warning system 10 according to this embodiment. The lane departure warning system 10 is a system that is configured by integrating the plural devices provided in the vehicle 1, and includes environment sensors 11, a supplementary information provision device 12, an ECU 13, a man-machine interface (MMI) 14, a light unit 15, a horn unit 16, and the like.

The environment sensors 11 are a collective term for plural sensors ES-1 to N, and monitors a periphery of the vehicle 1 by using the plural sensors ES-1 to N. When detecting the other vehicle in the detectable region S (FIG. 1), each of the environment sensors 11 transmits the detection signal to the ECU 13.

In addition to the other vehicle, each of the environment sensors 11 detects a structure, the lane, a pavement defect, a still object, a moving object, and the like on a road in the region S, for example. Each of the environment sensors 11 transmits the detection signal, which includes these types of environment-dependent information, to the ECU 13.

The supplementary information provision device 12 is at least one of an on-board device that provides map information and traffic information and a communication device that provides positional information of the other vehicle by inter-vehicular communication or road-to-vehicle communication, for example.

The ECU 13 includes a CPU that integrally controls operation of the lane departure warning system 10. The ECU 13 according to this embodiment has a function to warn the other vehicle when necessary in the case where the other vehicle leaves the lane or is estimated to leave the lane. Specific processing executed by the ECU 13 will be described below (FIG. 3).

The MMI 14 uses sound or light to notify a driver of the host vehicle 1 that the other vehicle, which leaves the lane, is currently warned. In this way, the driver can notice action of the host vehicle 1 for the other vehicle.

In addition, the MMI 14 sets whether to warn the other vehicle that leaves the lane. The driver may hesitate to warn the other vehicle. In such a case, on the MMI 14, the driver can set not to warn the other vehicle even when the other vehicle leaves the lane.

The light unit 15 is a collective term for plural beams and lamps, and visually warns the other vehicle that leaves the lane. The visual warnings include warnings by high beams, selective high beams that only illuminate the other vehicle, hazard lamps, brake lamps, fog lamps, and the like. These lamps illuminate the other vehicle, burn steadily, or blink for the other vehicle. The MMI 14 may allow to set the selection of any of these visual warnings.

The horn unit 16 aurally warns the other vehicle that leaves the lane. The auditory warning includes a warning by a honk. The MMI 14 may allow to set such selection that only the visual warning is made without the auditory warning or that only the auditory warning is made.

FIG. 3 is a flowchart of lane departure warning processing. This processing is appropriately executed by the CPU of the ECU 13 while the vehicle 1 travels.

First, the ECU 13 acquires the detection signals from the environment sensors 11 (SP1). The detection signal includes the information on the existence of the other vehicle in the detectable region S and the distance between the other vehicle and the lane, on which this other vehicle travels. Next, the ECU 13 acquires the map information, the traffic information, the positional information of the other vehicle, or the like from the supplementary information provision device 12 (SP2).

The ECU 13 determines whether warning the other vehicle, which unintentionally leaves the lane, is necessary on the basis of the information acquired in steps SP1 and SP2 (SP3).

For example, on the basis of the detection signals from the environment sensors 11, the ECU 13 determines that warning is unnecessary at a current time point in the case where the distance between the other vehicle and the lane, on which this other vehicle travels, is equal to or longer than a specified threshold value. On the other hand, in the case where the distance between the other vehicle and the lane is shorter than the specified threshold value, the ECU 13 determines that warning is necessary.

In addition, in the case where the distance between the other vehicle and the lane is rapidly reduced in a specified period (in the case where a reduced amount per unit time is large), the ECU 13 may estimate that the other vehicle will leave the lane in the future, and thus may determine that warning is necessary.

Furthermore, when detecting the existence of the other vehicle that approaches the host vehicle at an intersection with poor visibility on the basis of the information from the supplementary information provision device 12, the ECU 13 may determine that warning is necessary. However, in the case where it is set not to warn in the MMI 14, the ECU 13 determines that warning is unnecessary regardless of the information from the environment sensors 11 and the supplementary information provision device 12.

If warning is unnecessary (SP4: N), the processing returns to step SP1, and the ECU 13 acquires the detection signals from the environment sensors 11. On the other hand, if warning is necessary (SP4: Y), the ECU 13 causes the light unit 15 or the horn unit 16 to visually or aurally warn (SP5), and then the processing is terminated.

FIG. 4 to FIG. 6 each illustrate an exemplary circumstance where the other vehicle is warned about the departure from the lane. FIG. 4 illustrates a situation where the vehicle 1 and the other vehicle 100 travels in a right direction on the same lane. The other vehicle 100 travels ahead of the vehicle 1, and the other vehicle 100 is about to unintentionally leave the lane in a guardrail G direction just now.

In such a case, the vehicle 1 detects the departure of the other vehicle 100 from the lane by the environment sensors 11, and visually or aurally warns the other vehicle 100 (for example, by the high beams or the honk). In this way, a driver of the other vehicle 100 can notice the departure from the lane. As a result, the other vehicle 100 can take necessary action for safety.

FIG. 5 illustrates a situation where the vehicle 1 and the other vehicle 100 travels in the right direction on the same lane and a third vehicle 101 travels in a left direction on an opposite lane. The other vehicle 100 travels ahead of the vehicle 1, and the other vehicle 100 is about to unintentionally leave the lane in a direction toward the opposite lane just now.

In such a case, the vehicle 1 detects the departure of the other vehicle 100 from the lane by the environment sensors 11, and visually or aurally warns the other vehicle 100 (for example, by the high beams or the honk). In this way, the driver of the other vehicle 100 can notice the departure from the lane. As a result, the other vehicle 100 can take the necessary action for the safety.

FIG. 6 illustrates a situation where the vehicle 1 and the other vehicle 100 travels in the right direction on the same lane. The other vehicle 100 travels behind the vehicle 1, and the other vehicle 100 is about to unintentionally leave the lane in an obstacle Ob direction.

In such a case, the vehicle 1 detects the departure of the other vehicle 100 from the lane by the environment sensors 11, and visually or aurally warns the other vehicle 100 (for example, by the hazard lamps or the honk). In this way, the driver of the other vehicle 100 can notice the departure from the lane. As a result, the other vehicle 100 can take the necessary action for the safety.

As it has been described so far, according to this embodiment, it is possible to warn the other vehicle 100, on which the environment sensors 11 are not mounted, about the departure from the lane. By warning the other vehicle 100, which travels ahead of or next to the vehicle 1, about the departure of the other vehicle 100 from the lane, it is possible to prevent an alone accident of the other vehicle 100, a collision with the other vehicle 100, an entanglement accident originated from the other vehicle 100, and the like.

In addition, by warning the other vehicle 100, which travels behind the vehicle 1, about the departure of the other vehicle 100 from the lane, it is possible to prevent the alone accident of the other vehicle 100, the collision of the other vehicle 100 with a vehicle driving behind the other vehicle 100, the entanglement accident originated from the other vehicle 100, and the like.

Thus, in a current road condition in which the vehicle 1, on which the environment sensors 11 are mounted, and the other vehicle 100, on which the environment sensors 11 are not mounted, coexist, the safety of the other vehicle 100, on which the environment sensors 11 are not mounted, is improved. Therefore, the overall safety of the currently traveling vehicles including the vehicle 1 can be improved.

REFERENCE SIGNS LIST

1: Vehicle
10: Lane departure warning system
11: Environment sensor

12: Supplementary information provision device
13: ECU
14: MMI
15: Light unit
16: Horn unit
100: Another vehicle

The invention claimed is:

1. A lane departure system for a vehicle, the system comprising:
an output device; and
an electronic control unit (ECU) (13) configured to be communicatively connected to an environment sensor and to determine a departure from a lane in which the vehicle is traveling, wherein the ECU (13) determines whether another vehicle (100) ahead of or behind the vehicle leaves the lane on the basis of a detection signal from the environment sensor (11), and wherein the ECU is configured to generate and transmit a signal to the output device, causing the output device to create a visual or aural warning to the other vehicle (100) in response to determining when the other vehicle (100) leaves the lane and enters an area, wherein the area is outside of the lane in which the vehicle is currently traveling in, wherein the ECU (13) is further configured to determine, based on mapping information and traffic information from a supplementary information provision device (12), that the other vehicle (100) approaches the host vehicle at an intersection with poor visibility and, in response, generate the visual or aural warning.

2. The ECU (13) according to claim 1, wherein the ECU (13) is configured to generate a signal to create a visual or aural warning on the basis of positional information of the other vehicle (100) that is provided from a supplementary information provision device (12).

3. The ECU (13) according to claim 1, wherein the ECU (13) is configured to receive a selection from a man machine interface (14) that indicates a preference of whether to visually or aurally warn the other vehicle (100) in the case where the other vehicle (100) leaves the lane.

4. The ECU (13) according to claim 1, wherein the ECU (13) is configured to generate a visual warning by constantly illuminating with a light or blinking the light, and to generate an auditory warning by honking.

5. The ECU (13) according to claim 1, wherein the ECU (13) is configured to generate the visual or aural warning in response to determining that a distance between the other vehicle (100) and the lane is shorter than a specified threshold value.

6. The ECU (13) according to claim 1, wherein the ECU (13) is configured to estimate, based on a determination that a distance between the other vehicle (100) and the lane is rapidly reduced within a specified period of time, that the other vehicle (100) will leave the lane and, in response, generate the visual or aural warning.

7. A lane departure warning system (10) for a vehicle, the system (10) comprising:
an output device;
an ECU (13) that detects departure from a lane in which the vehicle is traveling; and
an environment sensor (11) that monitors a situation around a vehicle (1), wherein the ECU (13) determines whether another vehicle (100) in front of or behind the vehicle leaves the lane on the basis of a detection signal from the environment sensor (11), and to generate and transmit a signal to the output device, causing the output device to create a visual or aural warning to the other vehicle (100) in response to determining that the other vehicle (100) leaves the lane and enters an area, wherein the area is outside of the lane in which the vehicle is currently traveling in,
wherein the ECU (13) is further configured to determine, based on mapping information and traffic information from a supplementary information provision device (12), that the other vehicle (100) approaches the host vehicle at an intersection with poor visibility and, in response, generate the visual or aural warning.

* * * * *